2,719,833

METHODS OF PROCESSING POLYTETRAFLUOR-ETHYLENE AND PRODUCTS THEREFROM

Russell Swale Vincent, Finchampstead, and Francis Joseph Peter Julius Burger, London, England, assignors to British Dielectric Research Limited, London, England, a British company No Drawing. Application April 9, 1951, Serial No. 220,132

Claims priority, application Great Britain April 20, 1950

10 Claims. (Cl. 260—33.6)

The present invention provides an improved method of producing polytetrafluorethylene (hereinafter referred to as P. T. F. E.) in finely divided form from coarse grains.

The method is applicable, not only to the coarse grains of P. T. F. E. which constitute one commercial form of the manufactured material, but also to coarse grains obtained from the breaking up of scrap P. T. F. E. which has been processed by pressure moulding, by partial sintering, or by both of these. Completely sintered material cannot be treated by the method.

A partly sintered body of P. T. F. E. is one which has in some parts been fully sintered but in other parts is not, through not having been raised to the sintering temperature. For example the outside of a block of scrap material may be found to be fully sintered while the inside may still be in the pre-sinter stage. The invention provides furthermore an improved method of processing P. T. F. E. and the means for producing P. T. F. E. in novel forms alone or in admixture with other materials.

We have found that if the coarse grains are mixed with a suitable viscous and sticky material, or oily liquid, serving as a binder, to produce a plastic mass, this can be worked on a mill, such as is used for the milling of rubber, and the working produces in a short time substantial diminution of the size of the particles of P. T. F. E. Suitable binders are thermoplastic, viscous, sticky substances and oily liquids which are stable at the elevated temperatures which exist during the compounding process. Hereinafter the term "suitable binder" means substances of this kind.

The most suitable type of mill is the rubber compounding mill in which the material is fed between two smooth faced parallel rollers rotating at the same or different speeds. In general it is convenient to start the process with the rollers rotating at the same speed and subsequently to change to differential speed. Other forms of milling device which operate at a high shearing rate on a thin film under high pressure may be used, for example edge-mills and pestle and mortar. The term milling as used in this specification and in the claims means acting upon a material with a device having this action.

The choice of a binder from the general class of materials mentioned above is dependent upon whether or not it is to be separated from the P. T. F. E. after the particle size of the P. T. F. E. has been reduced and, if it is not to be removed, upon the use to which the material obtained is to be put. A large number of thermoplastic materials are suitable. They may be natural or synthetic and used with or without plasticisers. Following the practice common when treating rubber, the milling process is carried out at a sufficiently high temperature to attain the requisite degree of plasticity. The product coming from the mill may be, on cooling, a comparatively rigid and brittle material which is readily broken up by appropriate mechanical treatment. This may be an added advantage in some cases. Examples of such materials are polymethylmethacrylate and ethyl cellulose.

A class of binders consisting of materials having special properties of resistance to heat and other physical and chemical influences is of importance. These materials are particularly suitable for forming with P. T. F. E. a coherent body which can be used as such for certain purposes. Examples are silicones of the fluid, grease, resin and rubber types and certain fluorocarbon compounds, e. g. polymers of perfluorinated benzotrifluoride. The materials compounded of the finely divided P. T. F. E. and a binder of this class can be worked, as by extrusion, to provide articles of the required shape.

When P. T. F. E. of reduced particle size free from binder is required its removal may be effected by various means, either before or after shaping the mass produced on the mill. The binding material should be readily separable from the P. T. F. E., for instance by solution or by a heating process, carried out below the temperature at which P. T. F. E. sinters. A material which has been found suitable and very convenient for the process is polyisobutylene. Other materials such as natural or synthetic rubber or a mineral oil thickened with an organic polymer may be used as the binder in the milling process. The thickening medium may, if desired, be polyisobutylene, or rubber, or a natural or synthetic resin.

In an example of the process given by way of illustration, polyisobutylene having an average molecular weight of 10,000 is mixed in the proportion of 1 part by weight with a quantity (2 parts by weight) of coarse grains of P. T. F. E. This is done first by a preliminary rough mix, as in a mortar. In order to facilitate this work a small proportion of a volatile solvent for the polyisobutylene is added. Thereafter the mix is worked on a two-roll mill for twenty minutes, passing repeatedly between the rolls in this treatment. During this treatment the solvent is completely evaporated.

The product is a sheet of plastic material which can be used as such, being remarkable for its strong cohesion. If a larger amount of polyisobutylene or a polymer of lower molecular weight is used, the consistency of the product will vary somewhat and in the case where a thickened oil is used the resultant material is putty like but has somewhat more strength of cohesion than ordinary putty.

If the binder is dissolved out of the mass, e. g. by extraction in a Soxhlet extractor (e. g. with petroleum ether in the case of polyisobutylene) the P. T. F. E. remains behind in a coherent form retaining its shape, but of a porous texture. On the other hand, if the proportion of the viscous binder is first increased and the resultant sticky mix is then diluted with a suitable solvent, the P. T. F. E. is left in a very finely divided state in the form of a slurry consisting of soft particles.

It is pointed out above that the product of milling P. T. F. E. with the binder is a sheet of plastic material and that when the binder is removed from this sheet the P. T. F. E. remains in a coherent form retaining its shape while of a porous texture. For purposes where it is advantageous to destroy this coherent structure and obtain the separate fibres, this may be facilitated by applying a breaking-up or cutting-up treatment to the sheet which comes from the mill before it is extracted to remove the binder, or by applying a similar treatment to the product remaining after extraction.

The method of the invention also has the advantage of offering an opportunity of adding other very finely divided materials to the P. T. F. E. in such a way as to incorporate these materials in the P. T. F. E. Particular examples of such materials are pigments, which when applied by this method result in the production of coloured P. T. F. E. If the pigmented materials are to be sintered pigments will be chosen which do not deteriorate at the sintering temperature. Examples are cadmium seleno sulphides for yellow and red colours, cobalt blue and chrome green. Additions of the order of about 1%–2% by weight, based on the P. T. F. E., have been found to be suitable. Other examples are metals and carbons. These may be used, for instance, when it is desired to produce bodies possessing in some degree the properties of the added material, for instance, conductivity of electricity and of heat. It will be understood that materials added in this way must be substantially insoluble in the solvent by which the binder is removed, when this removal is included in the method of manufacture.

The particle size of the P. T. F. E. used in accordance with the invention is not critical. A convenient form is the moulding powder sold by Imperial Chemical Industries as "Fluon." This powder has an average particle diameter of 0.5 to 1 mm. The material, when still associated with the binder, may be of puttylike consistency, but harder or softer than this according to the nature and proportion of binder used. With some binders materials can be obtained which at elevated temperatures become more pliable without, however, melting. Depending on type of binder used, compounds may be obtained which remain flexible and mouldable at temperatures of −60° C.

The electrical properties of the product are chiefly governed by the nature and proportion of the binder, e. g. the addition of polyisobutylene and mixtures of mineral oil and polyisobutylene gives a material with a loss angle such that $\tan \delta = 0.003$ at 20° C. and a frequency of 50 C./S. The dielectric constant is of the order of 2.5 with mixes containing mineral oils and polyisobutylene.

After removal of the binder the product is in the form of a porous, flexible, coherent sheet or alternatively in the form of fluff and separate fibres, according to the amount and nature of binder used. The following detailed examples illustrate the method of the invention:

*Example 1*

40 g. P. T. E. F. ("Fluon" moulding powder sold by Imperial Chemical Industries Ltd.)
20 g. polyisobutylene (Vistanex LM–MS sold by the Angelo-American Oil Company. Average mol. wt. from 10,000 to 11,500)

The ingredients were pre-mixed by pestle and mortar and then transferred on to a two-roller rubber compounding mill. The mill was run with the rollers set at friction, their speed being in the ratio of 1.25:1, for 20 mins. The product was a tough flexible sheet. The polyisobutylene was removed by extracting it for 8 hours in a Soxhlet extractor using petroleum ether of 80–100° C. boiling range. The remaining P. T. F. E. was in the form of a white, porous sheet which was very pliable and resembled chamois leather in its consistency.

*Example 2*

40 g. P. T. F. E. ("Fluon" moulding powder sold by Imperial Chemical Inndustries Ltd.)
14.5 g. Sun XX Oil (supplied by Dussek Bros. & Co. Ltd.)
55 g. polyisobutylene ("Oronite 32" supplied by the Oronite Chemical Co. of California; average mol. wt. 3,000).

The ingredients after rough pre-mixing were milled for ½ hour on the rubber mill, as in the previous example. The resultant product was of a puttylike consistency. After extraction the P. T. F. E. remained behind in a fibrous, fluffy form.

*Example 3*

30 g. P. T. F. E. ("Fluon" moulding powder sold by Imperial Chemical Industries Ltd.)
10 g. Silicone D. C. 200, viscosity 200 C./S. (Manufactured by Dow Corning Corporation.)

The ingredients were pre-mixed and milled on a rubber mill for ½ hour; the resultant product was of a puttylike consistency.

*Example 4*

40 g. P. T. F. E. scrap
10 g. silicone D. C. 200; viscosity 12,500 C./S.

The ingredients were pre-mixed as before and milled on the rubber-mill for ½ hour as in the previous example. The P. T. F. E. scrap was material which had been moulded and partially sintered. It was in the form of small pieces of about ½ mm. diam. and larger. The end-product was of a wax-like consistency and was easily moldable by hand.

*Example 5*

20 g. P. T. F. E. scrap (as in Example 4).
20 g. polymethymethacrylate ("Perspex")

The ingredients were mixed and hot-milled at about 100° C., in a Banbury mixer; they were then transferred to the rubber mill. While on that type of mill a small proportion of toluene was needed in order to facilitate the milling.

The resultant product was obtained in the form of a tough sheet of a consistency of paper or cardboard. The polymethylmethacrylate can be extracted with acetone.

The preferred binders (most of which are mentioned in the above examples) are as follows:

(a) Polyisobutylene of an average molecular weight ranging between wide limits for example from 1,000 to upwards of 100,000. If a very high molecular weight polymer is used, a volatile solvent may also be used with advantage, for example toluene.

(b) Mixtures of polyisobutylene with mineral oil, for example a naphthenic base oil having viscosities of 120 centistokes at 60° C. and about 11 centistokes at 120° C. An example is a mixture containing 72% mineral oil and 28% of polyisobutylene.

(c) Silicones, for example the silicones marketed by the Dow Corning Corpn. under the name of "D. C. Fluids," e. g. D. C. 200, viscosity 200 seconds and D. C. 200, viscosity 12,000 seconds. Other types extending upwards in molecular weight, also the silicone rubbers and resins can be used.

(d) *Polymethylmethacrylate.*—The addition of toluene and the running of the mill at elevated temperature is of advantage when the solid variety of this kind of polymer is used. The average molecular weight may again vary between very wide limits. A particular example of this polymer which has been used is that known as "Perspex," but others, especially of the fluid type, may also be used.

(e) *Fluorocarbons.*—Such as perfluorinated benzotrifluoride polymers, highly fluorinated mineral oils and polymers of trifluorochloroethylene.

(f) *Ethyl cellulose.*—It will be apparent that these new forms of P. T. F. E. have a number of uses especially in applications requiring good electric and special mechanical properties associated with chemical inertness and resistance to high and low temperatures. As an example of the use of the puttylike form we quote its use as a cable joint filling compound, not only for filling the main space in the box, but also for filling cavities between paper tapes during the jointing operation. Alternatively, the puttylike materials and the firmer plastic compounds may be rolled to produce sheet material or may be extruded for production of shaped articles and for insulation of electrical conductors. The binders may be left in, if their presence is required, e. g. for increased flexibility, or may be removed leaving a coherent mass of P. T. F. E.

The finely divided form can be used in moulding or extrusion or in a papermaking process either alone or with other fibrous material.

The slurry consisting of the finely divided P. T. F. E. in a solution of the binder can be used for producing a coating or deposit of polytetrafluoroethylene on a surface by painting or spraying or by drawing the article to be coated through the slurry.

The porous sheet obtained by removing the binder with any remaining solvent residues by means of extraction is suitable for use as a filter or instead of paper for electrical insulation where its high temperature resistance will be useful. The removal of the binder may also be effected by thermal decomposition or by chemical attack.

What we claim as our invention is:

1. A method of reducing the particle size of polytetrafluoroethylene which comprises the steps of mixing granular polytetrafluoroethylene containing at least some particles having a maximum dimension above 0.5 mm. with a visco-adhesive binder, that is a binder capable of wetting both the milling surfaces and polytetrafluoroethylene, containing polyisobutylene, to produce a plastic mass and milling this mass in a rubber mill with rolls running at different speeds until the particles are reduced in size to the desired extent.

2. A method of reducing the particle size of polytetrafluoroethylene which comprises the steps of mixing granular polytetrafluoroethylene containing at least some particles having a maximum dimension above 0.5 mm. with polyisobutylene to produce a plastic mass and milling this mass with a shearing action until the articles are reduced in size to the desired extent.

3. A method of reducing the particle size of polytetrafluoroethylene which comprises the steps of mixing granular polytetrafluoroethylene containing at least some particles having a maximum dimension above 0.5 mm. with a major proportion of polyisobutyleene and a minor proportion of mineral oil to produce a plastic mass and milling this mass with a shearing action until the particles are reduced in size to the desired extent.

4. A method of reducing the particle size of polytetrafluoroethylene which comprises the steps of mixing granular polytetrafluoroethylene containing at least some particles having a maximum dimension above 0.5 mm. with mineral oil thickened with polyisobutylene to produce a plastic mass and milling this mass with a shearing action until the particles are reduced in size to the desired extent.

5. A method of producing a flexible, coherent, porous body of polytetrafluoroethylene which comprises the steps of mixing granular polytetrafluoroethylene containing at least some particles having a maximum dimension above 0.5 mm. with polyisobutylene to produce a plastic mass, milling this mass with a shearing action until the particles are converted to a fibrous form and removing the polyisobutylene from the polytetrafluoroethylene.

6. A method of producing a flexible, coherent, porous body of polytetrafluoroethylene which comprises the steps of mixing granular polytetrafluoroethylene containing at least some particles having a maximum dimension above 0.5 mm. with a mixture of a major proportion of polyisobutylene and a minor proportion of mineral oil to produce a plastic mass, milling this mass with a shearing action until the particles are converted to a fibrous form and removing the polyisobutylene and mineral oil from the polytetrafluoroethylene.

7. A method of producing a flexible, coherent, porous body of polytetrafluoroethylene which comprises the steps of mixing granular polytetrafluoroethylene containing at least some particles having a maximum dimension above 0.5 mm. with a visco-adhesive binder, and consisting of mineral oil thickened with polyisobutylene, to produce a plastic mass, milling this mass with a shearing action until the particles are converted to a fibrous form and removing the mineral oil thickened with an organic polymer from the polytetrafluoroethylene.

8. The method of producing polytetrafluoroethylene in a finely divided state in the form of a slurry which comprises the steps of mixing granular polytetrafluoroethylene containing at least some particle having a maximum dimension above 0.5 mm. with a visco-adhesive binder, that is, a binder capable of wetting both the milling surfaces and polytetrafluoroethylene, containing polyisobutylene to produce a plastic mass, milling this mass with a shearing action until the particles are reduced in size to the desired extent and adding sufficient of a solvent for the binder to the milled mass to dissolve the binder and form a slurry of the polytetrafluoroethylene in said solvent.

9. A method of reducing the particle size of polytetrafluorethylene which comprises the steps of mixing granular polytetrafluoroethylene containing at least some particles having a maximum dimension above 0.5 mm. with a visco-adhesive binder, that is a binder capable of wetting both the milling surfaces and polytetrafluoroethylene containing polyisobutylene, to produce a plastic mass and milling this mass with a shearing action until the particles are reduced in size to the desired extent.

10. A method of producing a flexible, coherent, porous body of polytetrafluorethylene which comprises the steps of mixing granular polytetrafluorethylene containing at least some particles having a maximum dimension above 0.5 mm. with a visco-adhesive binder, that is a binder capable of wetting both the milling surfaces and polytetrafluoroethylene containing polyisobutylene, to produce a plastic mass, milling this mass with a shearing action until the particles are converted to a fibrous form and removing the binder from the polytetrafluorethylene.

References Cited in the file of this patent

UNITED STATES PATENTS

| | | |
|---|---|---|
| 2,406,127 | Alfthan | Aug. 20, 1946 |
| 2,510,078 | Compton | June 6, 1950 |
| 2,644,802 | Lontz | July 7, 1953 |